(12) United States Patent
Tashiro et al.

(10) Patent No.: US 9,592,778 B2
(45) Date of Patent: Mar. 14, 2017

(54) BOOSTER CABLE HOLDING STRUCTURE

(71) Applicant: Yazaki Corporation, Tokyo (JP)

(72) Inventors: Hiroki Tashiro, Makinohara (JP); Hideki Kawamura, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/800,030

(22) Filed: Jul. 15, 2015

(65) Prior Publication Data
US 2016/0020536 A1    Jan. 21, 2016

(30) Foreign Application Priority Data

Jul. 18, 2014  (JP) ................................. 2014-147305

(51) Int. Cl.
*H01R 13/60* (2006.01)
*B60R 16/023* (2006.01)

(52) U.S. Cl.
CPC ................................. *B60R 16/0238* (2013.01)

(58) Field of Classification Search
CPC ...................................................... B60R 16/00
USPC .......................... 439/527, 507, 76.2; 174/135
See application file for complete search history.

(56) References Cited

U.S. PATENT DOCUMENTS

| | | | | |
|---|---|---|---|---|
| 5,772,468 A * | 6/1998 | Kowalski | ............... | H01R 11/24 439/506 |
| 5,795,193 A * | 8/1998 | Yang | .................... | H01R 9/2458 439/620.27 |
| 6,322,376 B1 * | 11/2001 | Jetton | .................... | H01R 4/302 411/107 |
| 6,679,708 B1 * | 1/2004 | Depp | ................... | H01R 9/2466 361/752 |
| 6,922,331 B2 * | 7/2005 | Ikeda | ..................... | H05K 7/026 361/624 |
| 7,422,474 B1 * | 9/2008 | Good | .................... | H01R 11/24 439/504 |
| 7,499,262 B1 * | 3/2009 | Darr | ....................... | H01R 9/226 361/626 |

(Continued)

FOREIGN PATENT DOCUMENTS

| | | | | |
|---|---|---|---|---|
| JP | 2009252453 A | * | 10/2009 | |
| JP | 2010093955 A | * | 4/2010 | |
| JP | WO 2010041521 A1 | * | 4/2010 | ............. H05K 7/026 |

*Primary Examiner* — Tulsidas C Patel
*Assistant Examiner* — Peter G Leigh
(74) *Attorney, Agent, or Firm* — Sughrue Mion, PLLC (57) ABSTRACT

A booster cable holding structure includes a clamping connection portion configured to be clamped by a clip portion of a booster cable. The clamping connection portion includes a relief terminal portion protruding in a tabular manner from a base structure made of insulating resin, and a terminal supporting resin portion extending in a tabular manner from the base structure over a surface of the relief terminal portion. The terminal supporting resin portion has a groove into which at least one tooth of the clip portion enters when the clip portion clamps the clamping connection portion, and a movement restricting wall configured to block a movement of the clip portion. The movement restricting wall is provided on a side toward which the clip portion having the tooth entered the groove is moved along the groove by an external force that pulls a cable of the booster cable.

3 Claims, 12 Drawing Sheets

(56) References Cited

U.S. PATENT DOCUMENTS

| | | | |
|---|---|---|---|
| 7,785,116 B2 * | 8/2010 | Akahori | B60R 16/0238 439/76.2 |
| 8,210,869 B2 * | 7/2012 | Nakatsuka | H01R 11/24 439/504 |
| 8,395,061 B2 * | 3/2013 | Asao | H02G 3/16 174/50 |
| 9,231,330 B2 * | 1/2016 | Tashiro | B60R 16/0238 |
| 2009/0253311 A1 * | 10/2009 | Akahori | B60R 16/0238 439/709 |
| 2014/0374139 A1 * | 12/2014 | Akahori | B60R 16/02 174/135 |
| 2015/0132978 A1 * | 5/2015 | Tashiro | B60R 16/0238 439/142 |

* cited by examiner

FIG. 12B in which a booster cable holding structure in an exemplary embodiment according to the invention is incorporated;

BOOSTER CABLE HOLDING STRUCTURE

CROSS-REFERENCE TO RELATED APPLICATIONS

The present application claims priority from Japanese Patent Application No. 2014-147305 filed on Jul. 18, 2014, the entire content of which are incorporated herein by reference.

FIELD OF INVENTION

The present invention relates to a structure of connecting and holding a booster cable to a relief terminal.

RELATED ART

Vehicles are mounted with a battery to start an engine and to supply electric power to electric components such as lamps. The battery is connected to an electric junction box having relays, fuses, and the like via a power supply line, so that the electric power is supplied to the electric components through the electric junction box. In recent years, vehicle batteries are becoming large-sized so as to be adapted to specifications of electric cars. For this reason, there is a tendency that the batteries are installed in, for example, a trunk room instead of an engine room.

In a case in which a battery installed in a trunk room is dead, the trunk room is opened to connect a booster cable to the battery. However, because the battery is arranged in a space provided on an inner side of an interior trim of the trunk room, this interior trim needs to be removed to connect the booster cable to the battery.

To eliminate this burdensome work, a related art structure is configured such that a booster cable is connected to a relief terminal portion of an electric junction box, instead of being connected directly to the battery, so that the battery is charged via the electric junction box. The relief terminal portion is clamped by a clip portion of the booster cable together with ribs provided along the relief terminal portion, so that the clip portion is held by teeth of the clip portion engaged between the ribs. (see, e.g., JP2009-252453A).

However, in this related art structure, when an electric wire of the booster cable is pulled with a force exceeding a holding force by the engagement of the clip portion into the ribs, the clip portion may move in an extending direction of the ribs and come off from the relief terminal portion.

SUMMARY

Illustrative aspects of the present invention provide a booster cable holding structure capable of preventing a clip portion of the booster cable from being detached from the relief terminal portion.

Illustrative aspects of the present invention provide a booster cable holding structure including a clamping connection portion configured to be clamped by a clip portion of a booster cable. The clamping connection portion includes a relief terminal portion provided to protrude in a tabular manner from a base structure made of insulating resin, and a terminal supporting resin portion made of resin and provided to extend in a tabular manner from the base structure over a surface of the relief terminal portion. The terminal supporting resin portion has a groove into which at least one tooth of the clip portion enters when the clip portion clamps the clamping connection portion, and a movement restricting wall configured to block a movement of the clip portion. The movement restricting wall is provided on a side toward which the clip portion having the tooth entered the groove is moved along the groove by an external force that pulls a cable of the booster cable.

The groove may be configured to extend linearly, and may have, with respect to a direction in which the groove extends, one end closed by the movement restricting wall and the other end being opened.

The movement restricting wall may have a wall height that is flush with an upper end face of the groove with respect to a direction of a depth of the groove.

According to the booster holding structure as described above, an inner side face of the groove functions as a guide for moving the tooth up to the movement restricting wall, and at the same time, functions for preventing inclination of the clip portion, thus enabling the clip portion to be maintained in a state where the tooth has entered in the groove. Moreover, as the clip portion goes on moving upward along the groove, the tooth is butted against the movement restricting wall, and hence, the movement of the clip portion is blocked. In this manner, it is possible to prevent the clip portion of the booster cable from being disengaged from the relief terminal portion.

Moreover, in molding the groove by means of molds, a part of the mold corresponding to a shape of the groove can be extracted from the end of the groove at the open side in the extending direction. Therefore, it is possible to mold the groove, using a small number of the molds, without necessity of extracting in a direction of the depth of the groove. Consequently, it is possible to reduce a cost for molding by means of the molds.

Moreover, in case where the movement restricting wall has such the wall height that the wall is flush with the upper end face of the groove in the direction of the depth of the groove, it is possible to make shapes of the molds simple, and consequently, molding work using the molds can be easily performed.

DETAILED DESCRIPTION

Hereinafter, exemplary embodiments of the present invention will be described in detail with reference to the drawings.

Figure 1:
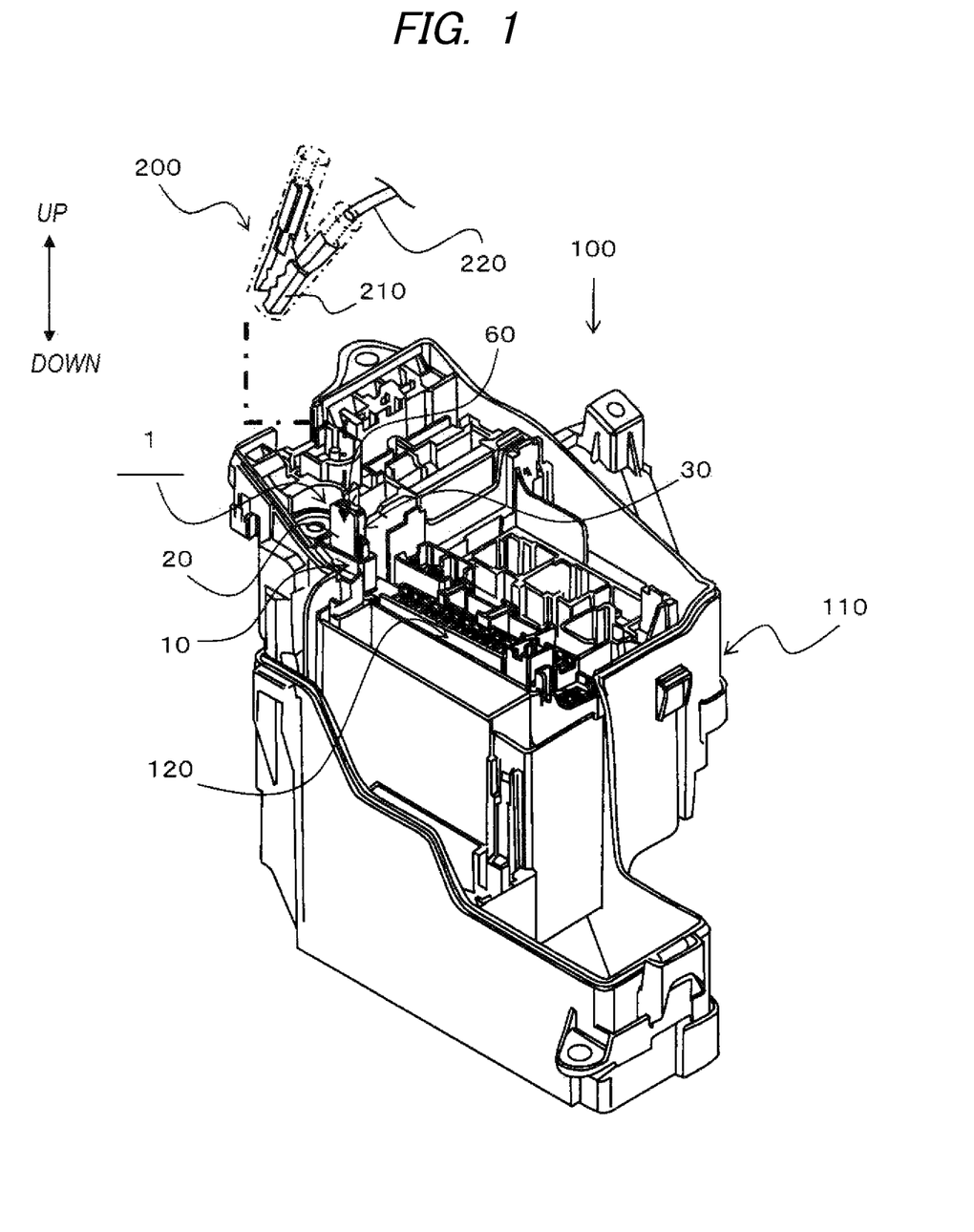
FIG. 1 is a perspective view of an electric junction box in which a booster cable holding structure in an exemplary embodiment according to the invention is incorporated.
Figure 2:
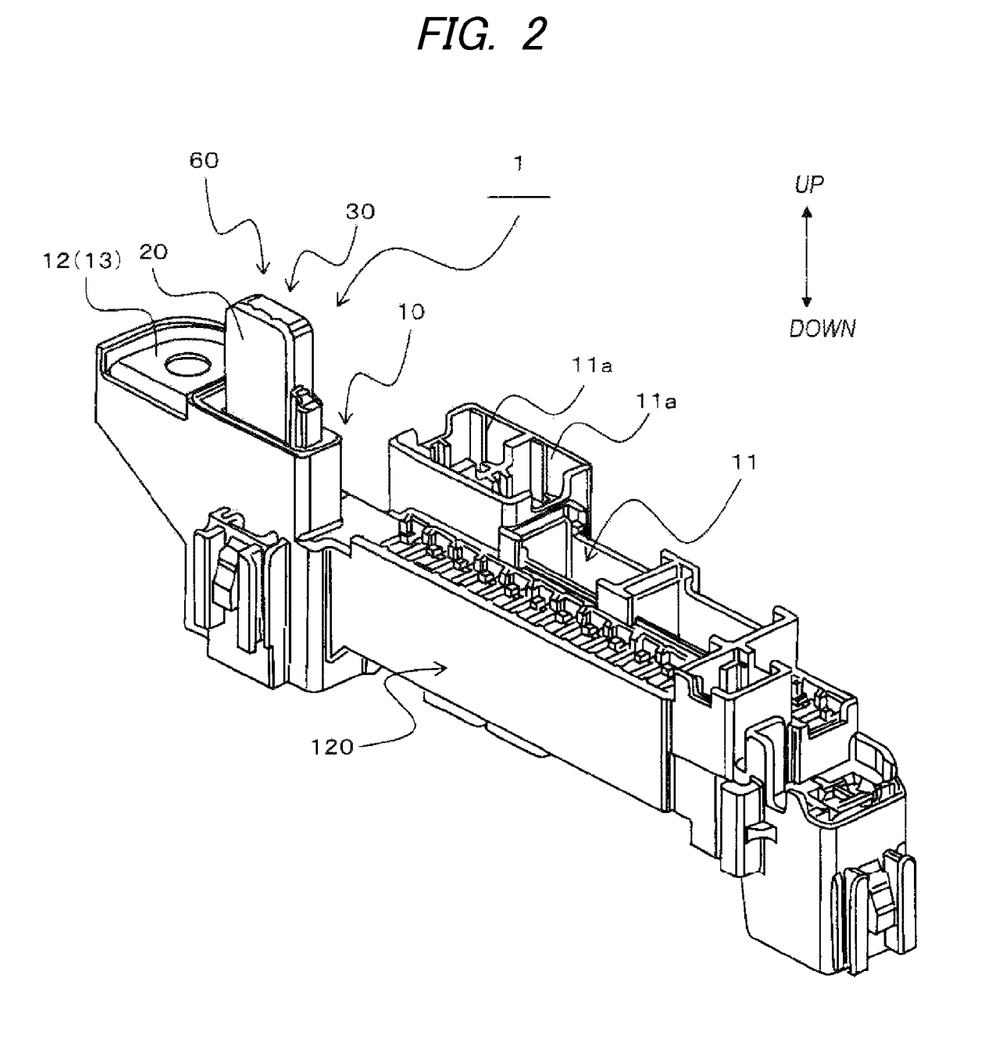
FIG. 2 is a perspective view of a base structure of the booster cable holding structure which is removed from a case body of the electric junction box.
Figure 3:
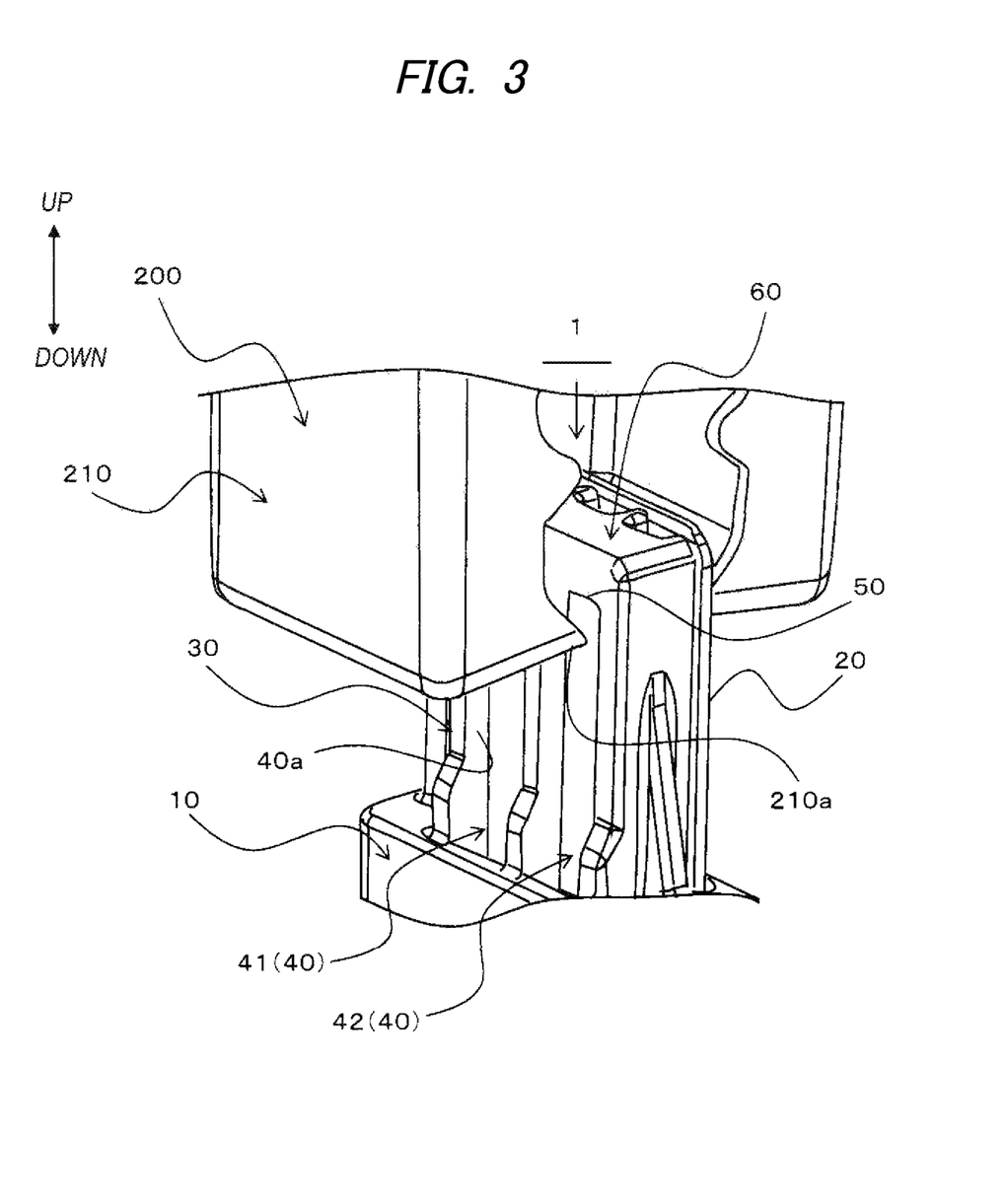
FIG. 3 is a perspective view of a region surrounding a clamping connection portion of the booster cable holding structure, and the booster cable which clamps the clamping connection portion, as seen from a side of a terminal supporting resin portion.
Figure 4:
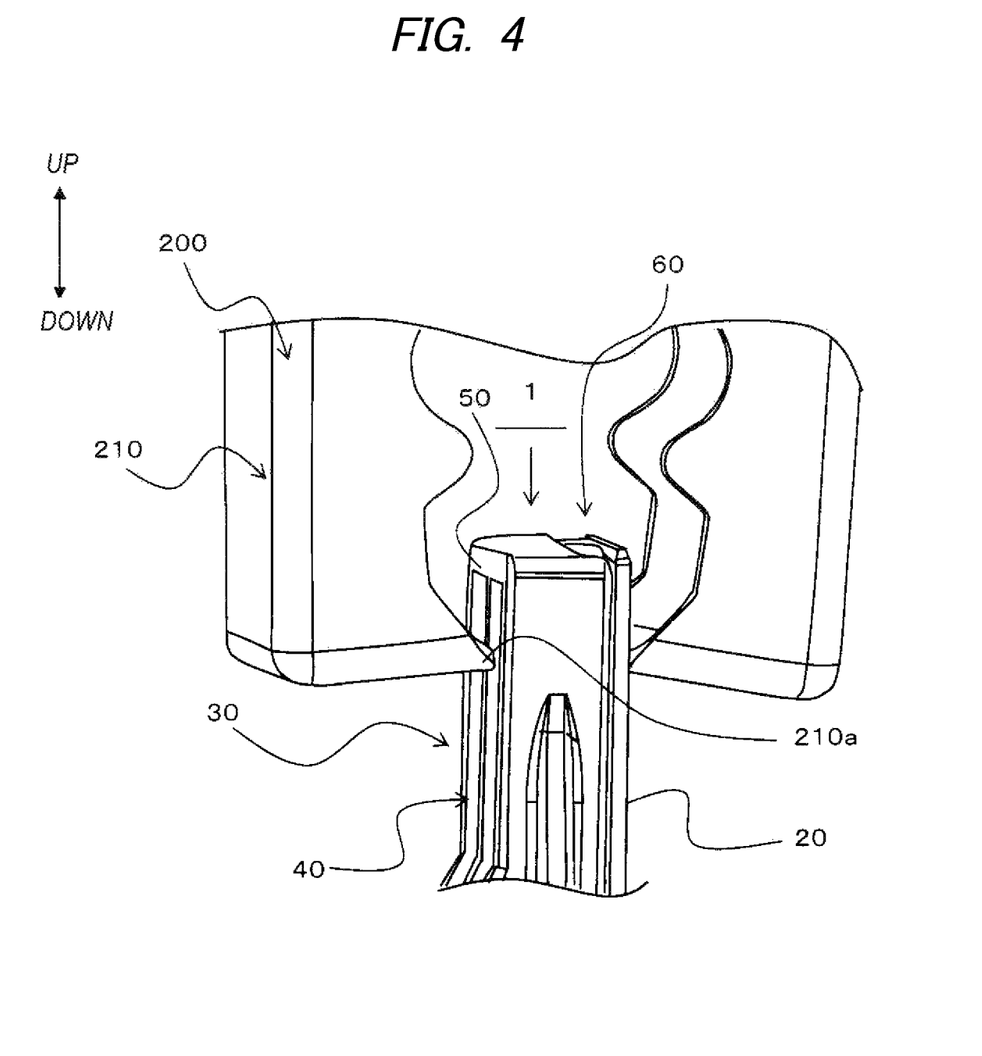
FIG. 4 is a view of the region surrounding the clamping connection portion of the booster cable holding structure and the booster cable which clamps the clamping connection portion which are shown in FIG. 3, as seen from a lateral side of the clamping connection portion.
Figure 5:
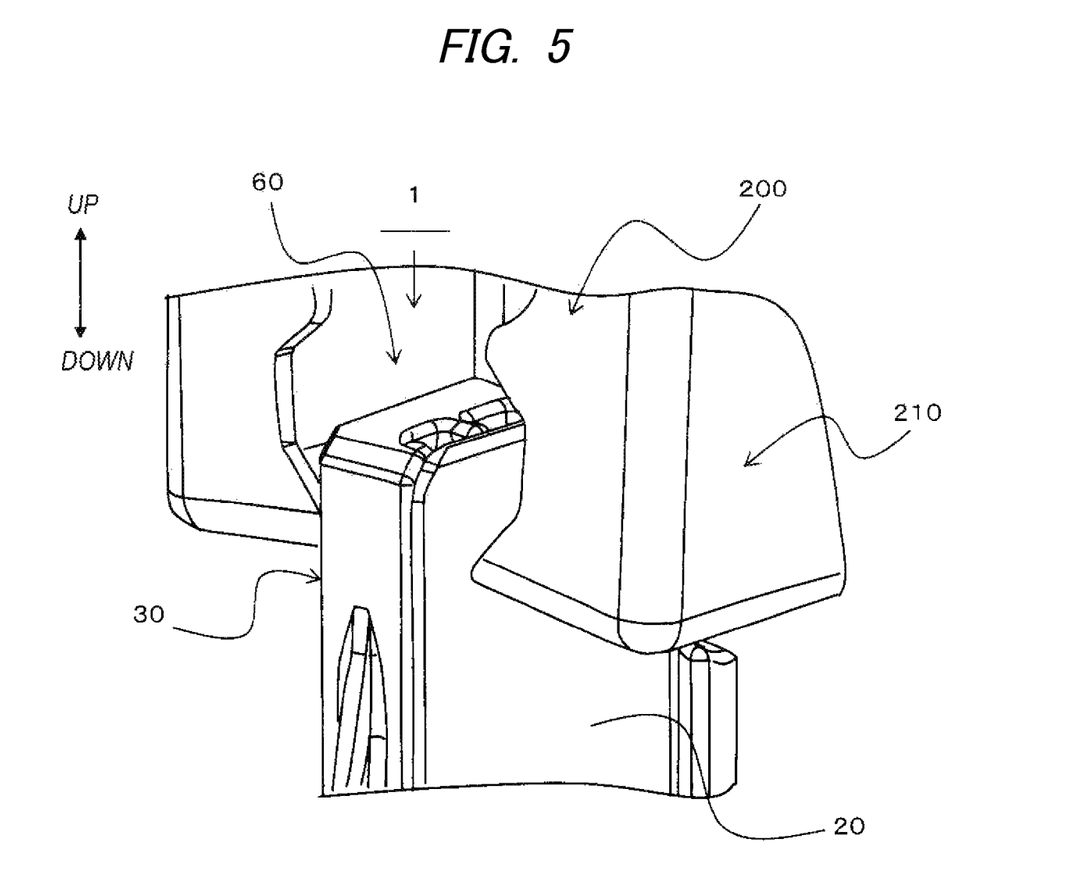
FIG. 5 is a view of the region surrounding the clamping connection portion and the booster cable which are shown in FIG. 3, as seen from a side of a relief terminal portion.
Figure 6:
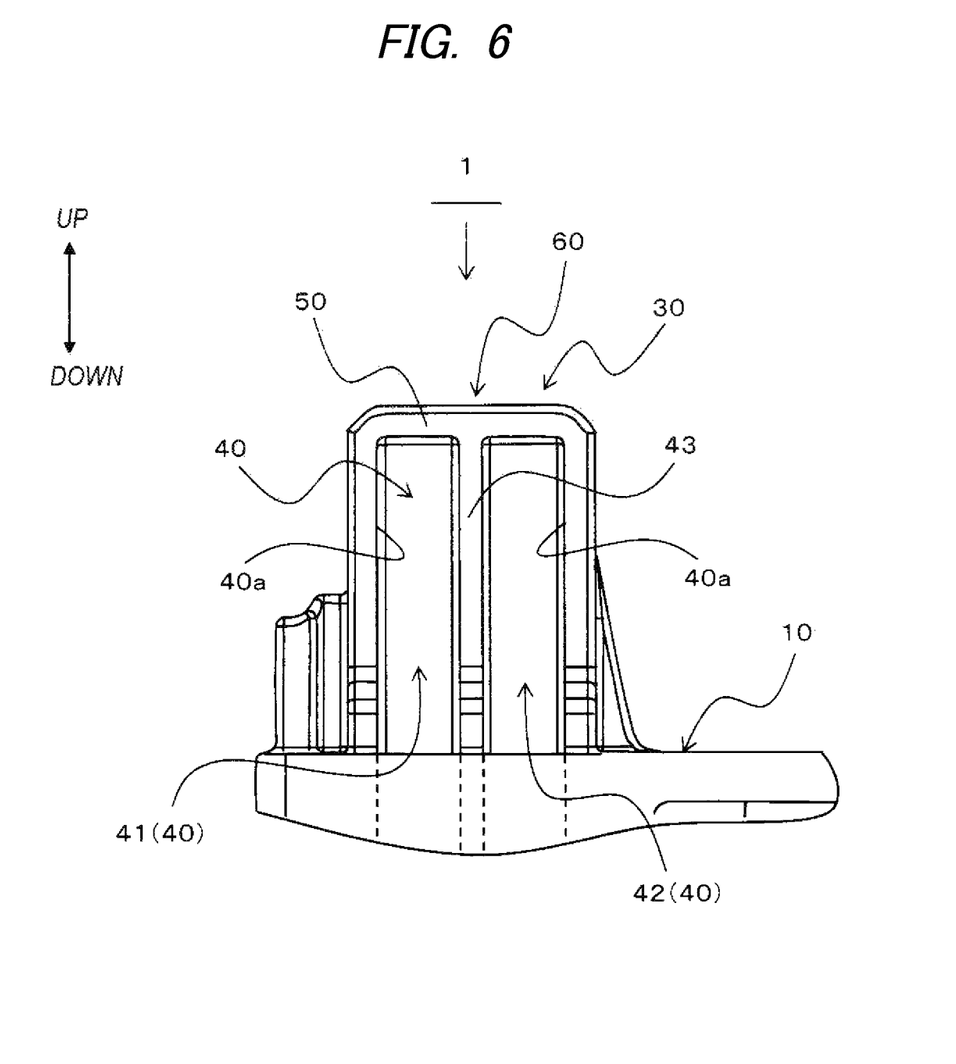
FIG. 6 is a front view of the region surrounding the clamping connection portion, as seen from the side of the terminal supporting resin portion.
Figure 7:
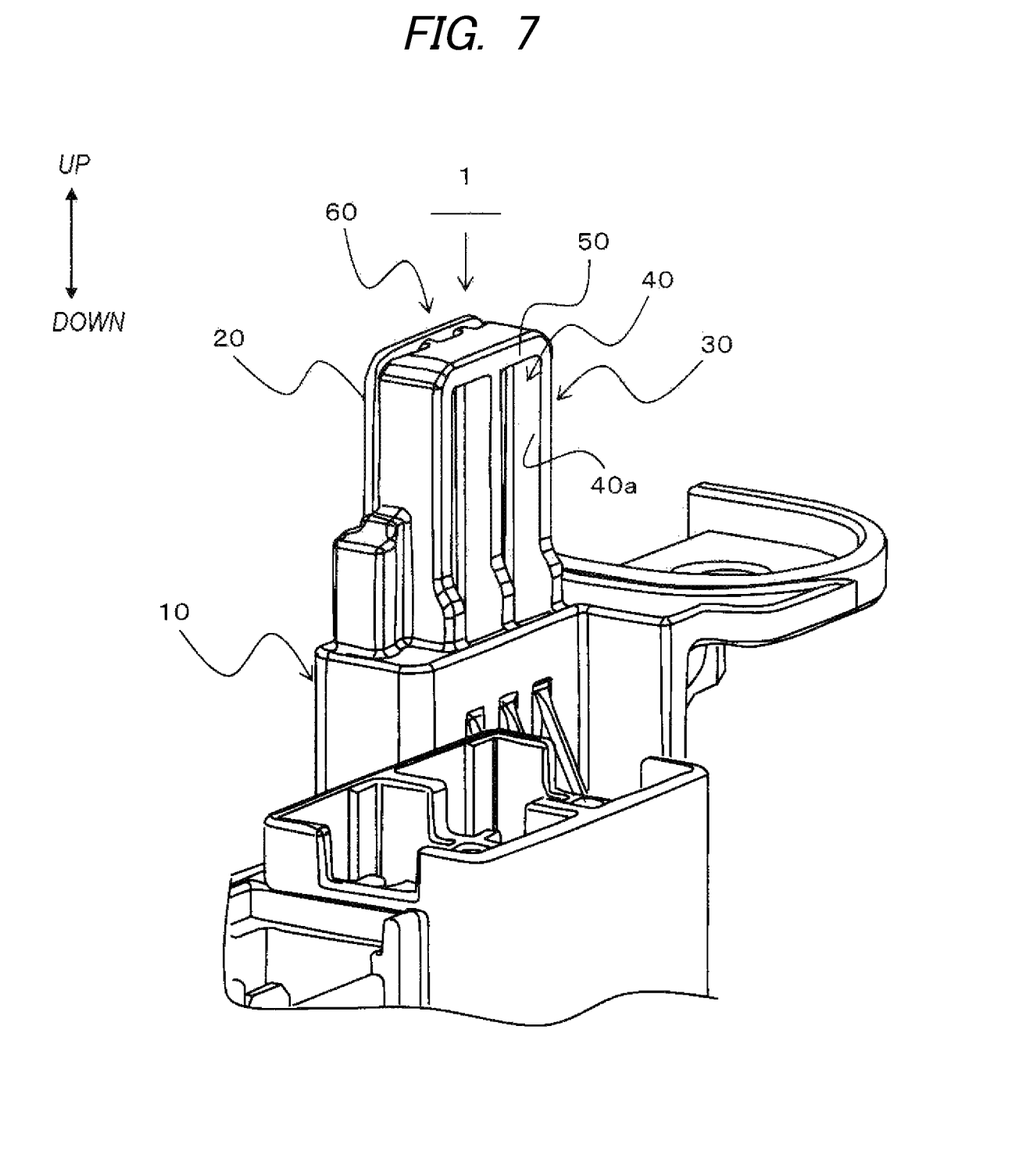
FIG. 7 is a perspective view of the region surrounding the clamping connection portion.
Figure 8:
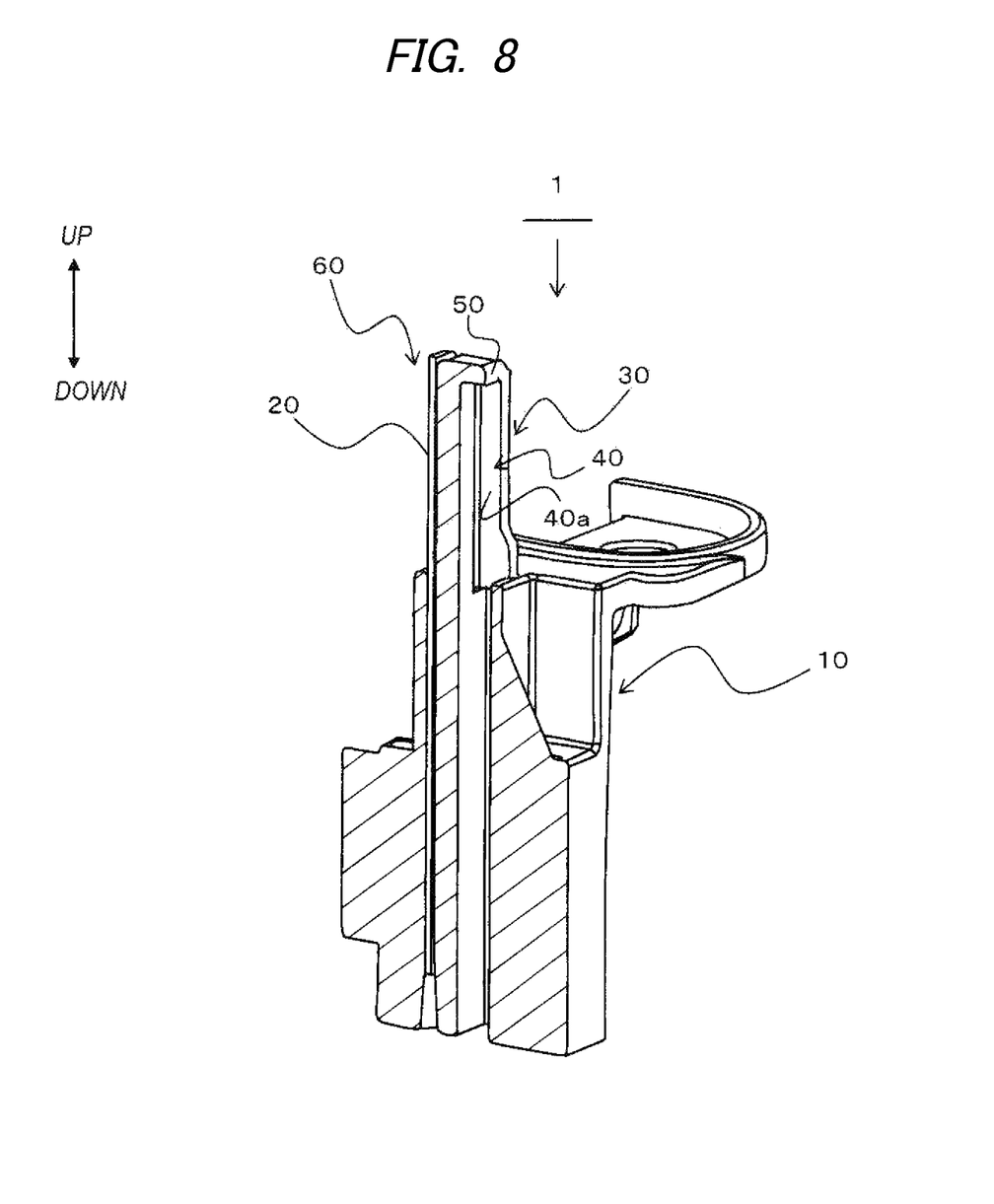
FIG. 8 is a perspective view, partly in section, of the terminal supporting resin portion.
Figure 9:
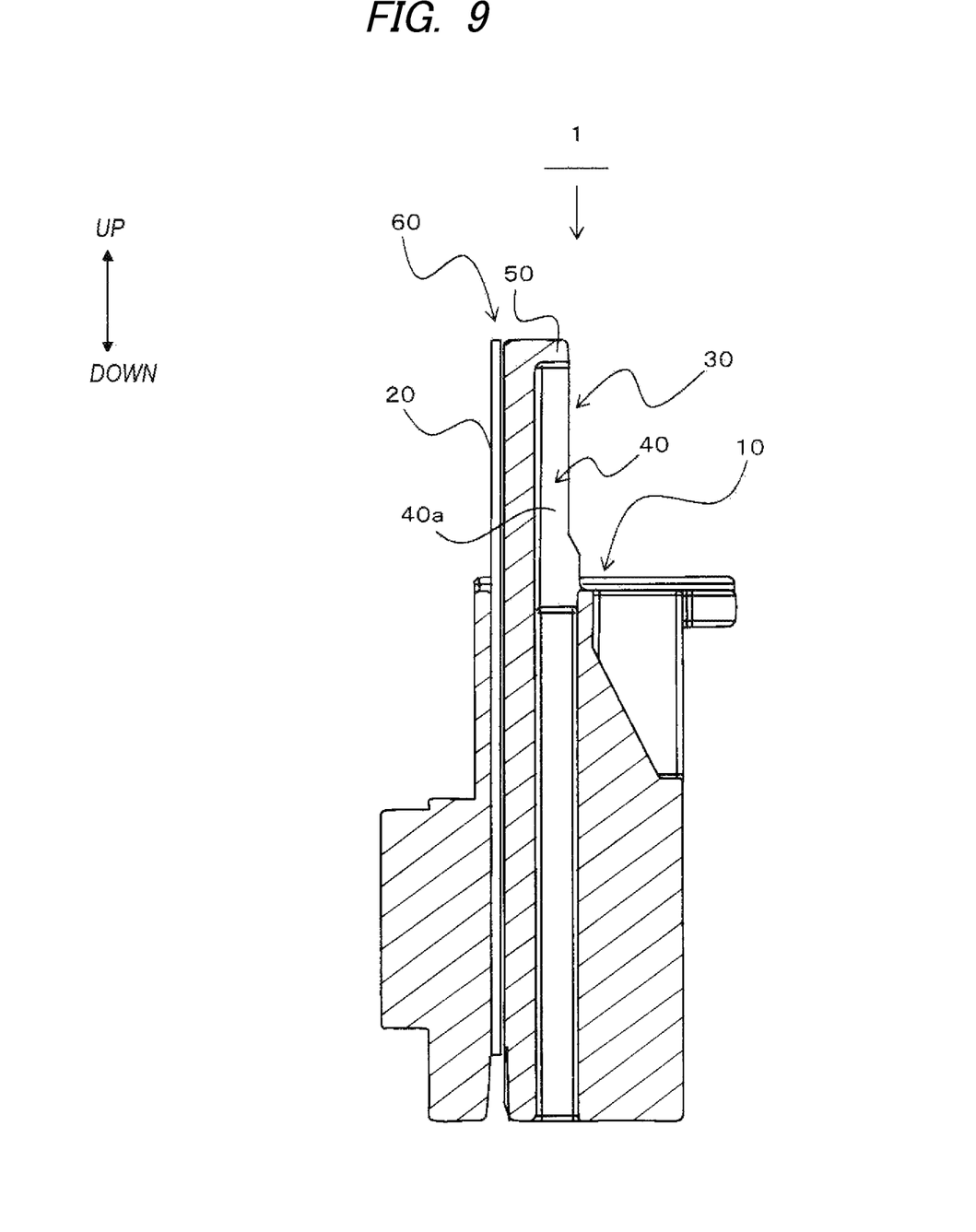
FIG. 9 is a sectional view of the terminal supporting resin portion.
Figure 10:
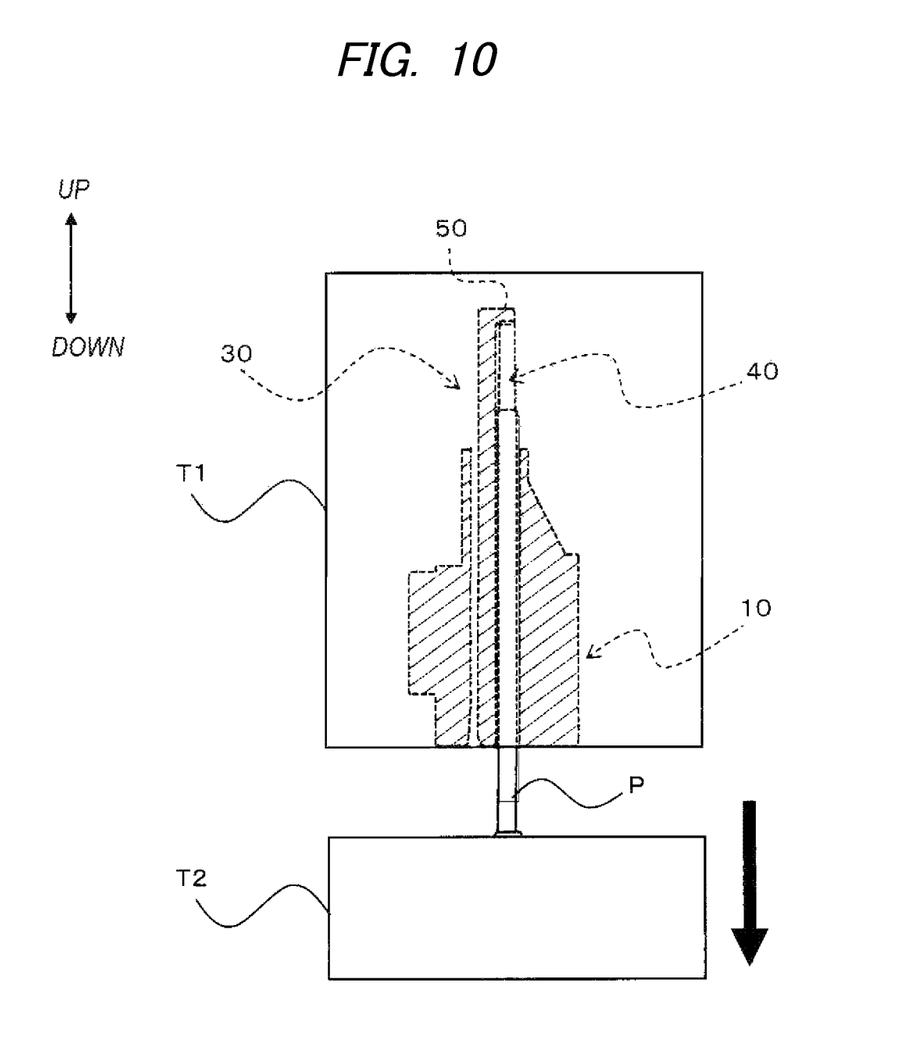
FIG. 10 is a view for explaining a molding work of a block using molds.
Figure 11A:
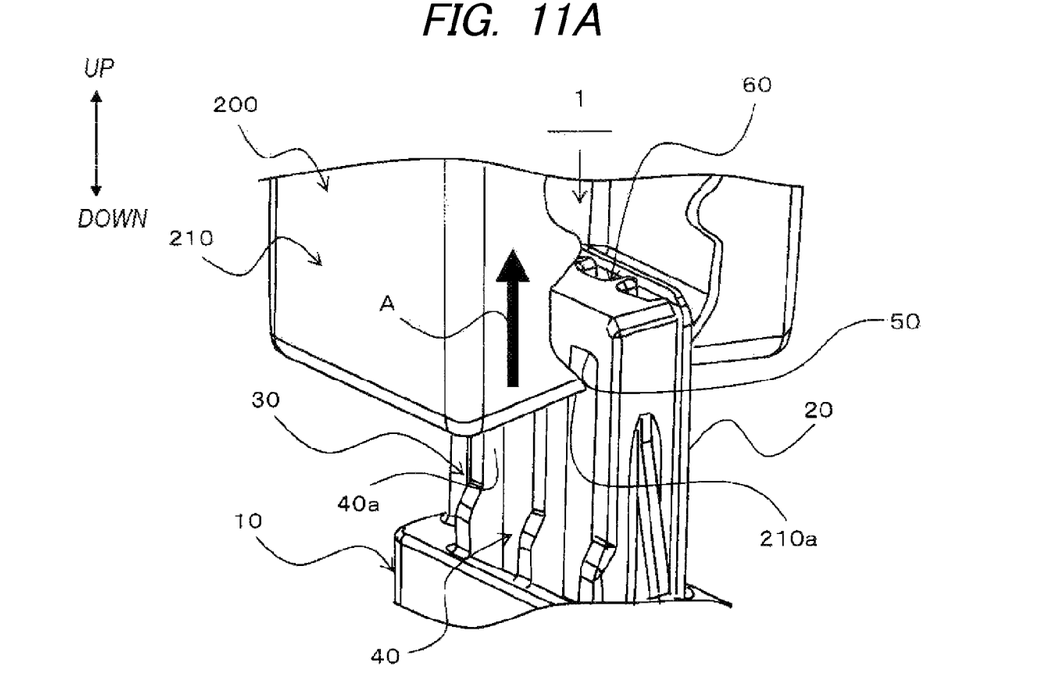
FIG. 11A is a view for explaining operation of the clip portion, when a cable of the booster cable is pulled.
Figure 11B:
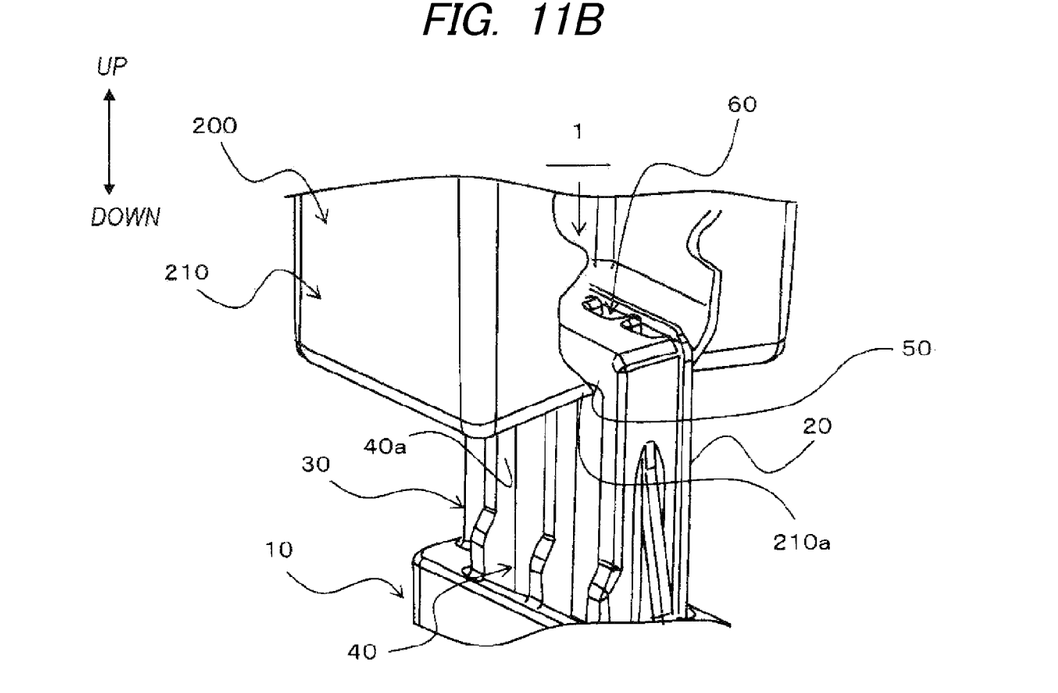
FIG. 11B is another view for explaining operation of the clip portion, when the cable of the booster cable is pulled.

FIG. 1 is a perspective view of an electric junction box 100 in which a booster cable holding structure 1 in an exemplary embodiment according to the invention is incorporated. FIG. 2 is a perspective view of a base structure 10 of the booster cable holding structure 1 which is removed from a case body 110 of the electric junction box 100. FIG. 3 is a perspective view of a region surrounding a clamping connection portion 60 of the booster cable holding structure 1, and a booster cable 200 which clamps the clamping connection portion 60, as seen from a side of a terminal supporting resin portion 30. FIG. 4 is a view of the region surrounding the clamping connection portion 60 of the booster cable holding structure 1 and the booster cable 200 which clamps the clamping connection portion 60, which are shown in FIG. 3, as seen from a lateral side of the clamping connection portion 60. FIG. 5 is a view of the region surrounding the clamping connection portion 60 and the booster cable 200 which are shown in FIG. 3, as seen from a side of a relief terminal portion 20. FIG. 6 is a front view of the region surrounding the clamping connection portion 60, as seen from the side of the terminal supporting resin portion 30. FIG. 7 is a perspective view of the region surrounding the clamping connection portion 60. FIG. 8 is a perspective view, partly in section, of the terminal supporting resin portion 30. FIG. 9 is a sectional view of the terminal supporting resin portion 30. FIG. 10 is a view for explaining a molding work of a block 120 using molds. FIG. 11 is views for explaining operation of the clip portion 210 when a cable 220 of the booster cable 200 is pulled. It is to be noted that in the exemplary embodiment according to the invention, upward and downward directions are defined as shown in the drawings, for convenience of explanation.

The booster cable holding structure 1 in the exemplary embodiment according to the invention is provided in the electric junction box 100 which is installed, for example, in an engine room of a vehicle. Therefore, in case where a battery which is not shown, but installed in a trunk room of the vehicle dead, it is possible to charge the battery which is not shown, by connecting the booster cable 200 to the relief terminal portion 20 of the booster cable holding structure 1, instead of connecting the booster cable 200 to the battery. It is to be noted that in this exemplary embodiment, details of the booster cable holding structure 1 will be described, while describing a general structure of the electric junction box 100.

The electric junction box 100 includes the block 120 in which the booster cable holding structure 1 is provided, the case body 110 to which the block 120 is attached, an upper cover which is not shown, but covers an opening on an upper face of the case body 110, and a lower cover which is not shown, but covers an opening on a lower face of the case body 110.

The block 120 includes a base block 10 made of insulating resin, a bus bar 13 for forming a conductive path of the electric junction box 100, which is incorporated into the base block 10, an electric component mounting portion 11 for mounting electric or electronic components which are not shown, a power line connecting portion 12 for connecting a power supply line which is not shown, but connected to the battery which is not shown, and the booster cable holding structure 1.

The bus bar 13 is a metal plate member formed by stamping, and the relief terminal portion 20 and the power line connecting portion 12 are formed as portions of the bus bar 13.

The electric component mounting portion 11 is provided with a plurality of component mounting rooms 11a which are separated by partition walls corresponding to respective electric or electronic components so that the respective electric or electronic components can be mounted from an upper face side of the block 120. When the respective electric or electronic components are mounted to the respective component mounting rooms 11a, the respective electric or electronic components are connected to terminal components which are not shown, but arranged in the component mounting rooms 11a. In this manner, the electric or electronic components are electrically connected to electric wires or the like which are not shown, by way of the terminal components.

The power line connecting portion 12 is a part for fixing a terminal of the power supply line which is not shown, but connected to a positive electrode of the battery which is not shown, by means of a securing member such as a bolt, nut, etc. By connecting the terminal of the power supply line to the power line connecting portion 12, electrical continuity is established between the relief terminal portion 20 and the power supply line which is not shown.

The booster cable holding structure 1 has the clamping connection portion 60 including the relief terminal portion 20 provided to protrude in a tabular manner from the base block 10 (a base structure) made of insulating resin, and the terminal supporting resin portion 30 provided to extend in a tabular manner from the base block 10 over a surface of the relief terminal portion 20. This clamping connection portion 60 functions as a part to be clamped by the clip portion 210 of the booster cable 200.

The relief terminal portion 20 is arranged such that a portion of the bus bar 13 is protruded upward above an upper end face of an outer peripheral wall of the case body 110, and such that its one surface is overlaid on the terminal supporting resin portion 30.

The terminal supporting resin portion 30 is made of insulating resin in the same manner as the base block 10, and integrally molded with the base block 10. The terminal supporting resin portion 30 extends upward to cover the one surface of the relief terminal portion 20, and its distal end face is substantially flush with a distal end face of the relief terminal portion 20. In this manner, the terminal supporting resin portion 30 functions to support the relief terminal portion 20. The clamping connection portion 60 provided by superposing the relief terminal portion 20 and the terminal supporting resin portion 30 in a manner described above, is so adjusted that a total thickness of the relief terminal portion 20 and the terminal supporting resin portion 30 may be such a thickness as capable of being clamped by the clip portion 210.

The terminal supporting resin portion 30 has a groove 40 into which at least one tooth 210a of the clip portion 210 enters, when the clip portion 210 clamps the clamping connection portion 60, and a movement restricting wall 50 for restricting movement of the clip portion 210. The movement restricting wall 50 is provided on a side toward which the clip portion 210 having the tooth 210a entered the groove 40 is moved along the groove 40 by an external force that pulls the cable of the booster cable 200.

The groove 40 is configured to extend linearly, and has, with respect to a direction in which the groove 40 extends, one end closed by the movement restricting wall 50 and the other end being opened. More specifically, the groove 40 extends from a lower end of the base block 10 up to the movement restricting wall 50 provided at the upper end of the terminal supporting resin portion 30.

The groove 40 is provided with a partition wall 43 for dividing the groove 40 into halves, at a substantially center in a lateral direction of the terminal supporting resin portion 30. Specifically, the groove 40 has a first groove 41 and a second groove 42 in the lateral direction of the terminal supporting resin portion 30. The two teethes 210a which are arranged in the lateral direction of the clip portion 210 respectively enter into the first and second grooves 41 and 42 of the groove 40.

The movement restricting wall 50 is the wall for blocking the upper end side in the extending direction of the groove 40. Specifically, in this exemplary embodiment, this movement restricting wall 50 is the wall for blocking the upper end parts in the extending direction of the first groove 41 and the second groove 42. This movement restricting wall 50 has a wall height that is flush with the upper end face of the groove 40 with respect to a direction of a depth of the groove 40.

In case where the terminal supporting resin portion 30 as described above is integrally molded with the base block 10, it is possible to mold it, for example, between a pair of upper and lower molds T1, T2, as shown in FIG. 10. This is because the groove 40 is configured to extend linearly, and has, with respect to the direction in which the groove 40 extends, one end closed by the movement restricting wall 50 and the other end being opened. For this reason, on occasion of opening the upper and lower molds T1, T2 which have been closed for molding, it is possible to extract a part P of the mold T2 corresponding to a shape of an inner face of the groove 40 so as to move along the groove 40.

Now, referring to FIGS. 11A and 11B, operation of the clip portion 210, in case where the cable 220 of the booster cable 200 is pulled, will be described. FIGS. 11A and 11B are views for explaining the operation of the clip portion 210, in case where the cable 220 of the booster cable 200 is pulled.

When the cable 220 of the booster cable 200 is pulled, the clip portion 210 moves upward along the groove 40, as shown by an arrow mark A in the drawing (See FIG. 11A). On this occasion, an inner side face 40a of the groove 40 which extends in the extending direction of the groove 40 functions as a guide for moving the tooth 210a up to the movement restricting wall 50, and at the same time, functions for preventing inclination of the clip portion 210. As the results, the clip portion 210 can be maintained in a state where the tooth 210a has entered in the groove 40 along with the upward movement.

As the clip portion 210 goes on moving upward along the groove 40, the tooth 210a of the clip portion 210 is butted against the movement restricting wall 50 (See FIG. 11B). In this manner, the movement of the clip portion 210 is blocked.

In the booster cable holding structure 1 in the exemplary embodiment according to the invention, in case where the cable 220 of the booster cable 200 is pulled, the inner side face 40a of the groove 40 which extends in the extending direction of the groove 40 functions as the guide for moving the tooth 210a up to the movement restricting wall 50, and at the same time, functions for preventing inclination of the clip portion 210. As the results, the clip portion 210 can be maintained in a state where the tooth 210a has entered in the groove 40. Moreover, as the clip portion 210 goes on moving upward along the groove 40, the tooth 210a of the clip portion 210 is butted against the movement restricting wall 50, and hence, the movement of the clip portion 210 is blocked. In this manner, it is possible to prevent the clip portion 210 of the booster cable 200 from being disengaged from the relief terminal portion 20.

Moreover, in the booster cable holding structure 1 in the exemplary embodiment according to the invention, when the groove 40 is molded by means of the molds T1, T2, the part P of the mold T2 corresponding to the shape of the groove 40 can be extracted from the end of the groove 40 at the open side in the extending direction. Therefore, it is possible to mold the groove 40 using a small number of the molds, without necessity of extracting in the direction of the depth of the groove 40. Consequently, it is possible to reduce a cost for molding by means of the molds.

Moreover, in the booster cable holding structure 1 in the exemplary embodiment according to the invention, the movement restricting wall 50 has such the wall height that the wall is flush with the upper end face of the groove 40 in the direction of the depth of the groove 40. Therefore, it is possible to make the shapes of the molds T1, T2 simple, and consequently, molding work using the molds T1, T2 can be easily performed.

Figure 12A:
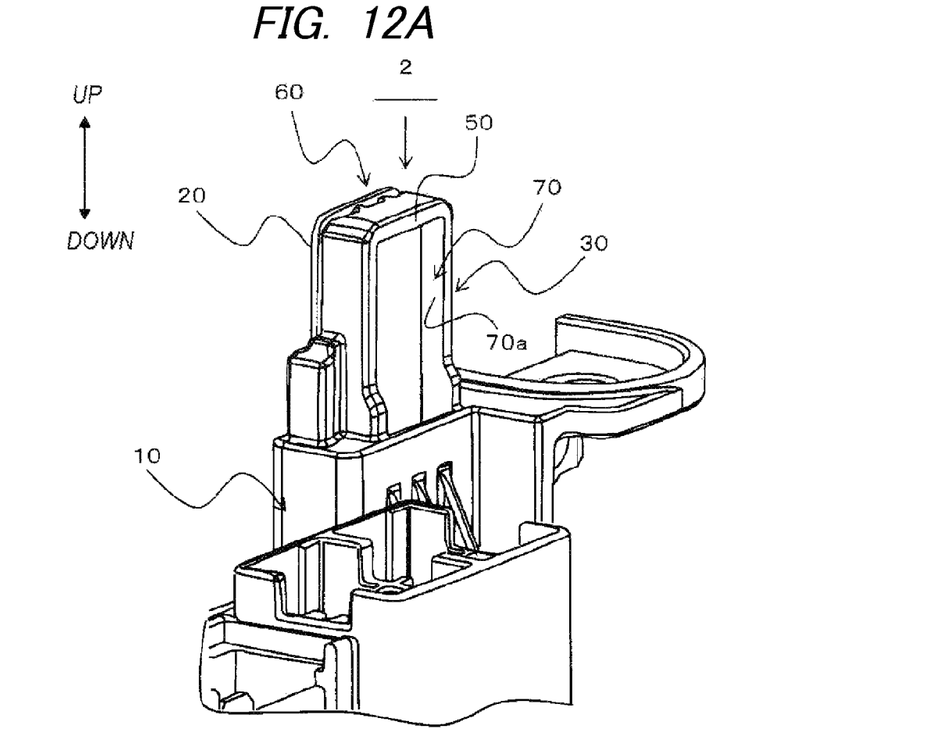
FIG. 12A is a perspective view of a region surrounding a clamping connection portion of a booster cable holding structure in a modified example.
Figure 12B:
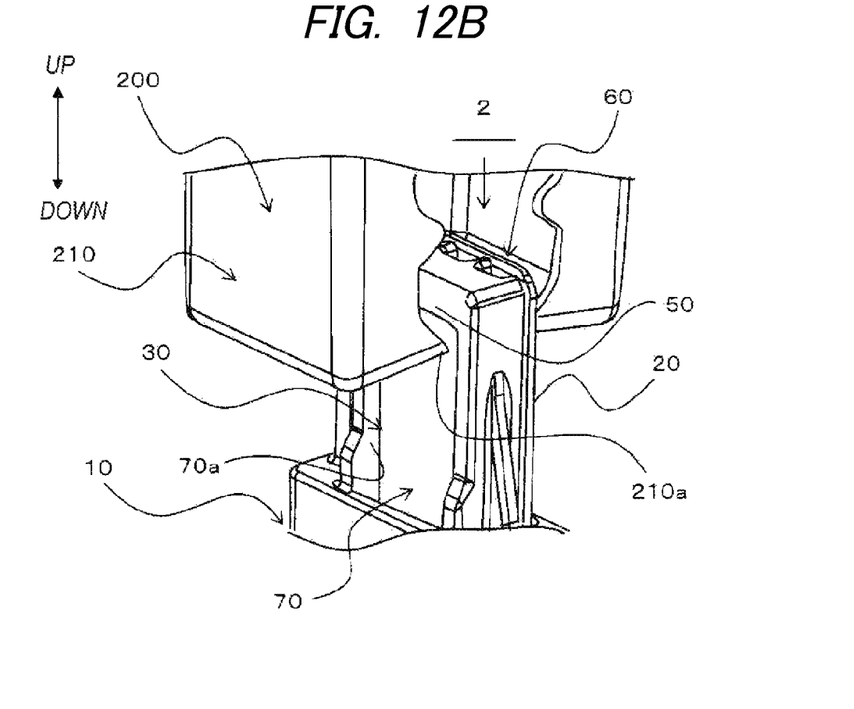
FIG. 12B is a perspective view of the region surrounding the clamping connection portion of the booster cable holding structure, and the booster cable which clamps the clamping connection portion in the modified example, as seen from a terminal supporting resin portion.

With reference to FIGS. 12A and 12B, a modified example of the booster cable holding structure in the exemplary embodiment according to the invention will be described. FIG. 12A is a perspective view of a region surrounding a clamping connection portion 60 of a booster cable holding structure 2 in the modified example, and FIG. 12B is a perspective view of the region surrounding the clamping connection portion 60 of the booster cable holding structure 2 and the booster cable 200 which clamps the clamping connection portion 60, as seen from a side of the terminal supporting resin portion 30. This booster cable holding structure 2 in the modified example is different from the booster cable holding structure 1 in the exemplary embodiment in that the groove 40 is not divided into the two groove parts 41, 42. It is to be noted that this modified example is substantially the same as the exemplary embodiment in respect of the other structure, and constituent elements which are the same as those in the exemplary embodiment are denoted with the same reference numerals.

In the booster cable holding structure 2, the terminal supporting resin portion 30 is provided with only one groove 70, and the two teeth 210a of the clip portion 210 enter into this one groove 70.

In this booster cable holding structure 2 in the modified example, in case where the cable 220 of the booster cable 200 is pulled, an inner side face 70a of the groove 70 extending in an extending direction of the groove 70 functions as a guide for moving the teeth 210a up to the movement restricting wall 50, and at the same time, functions for preventing inclination of the clip portion 210. In this manner, it is possible to maintain the clip portion 210 in a state where the teeth 210a have entered into the groove 70. Moreover, as the clip portion 210 goes on moving upward along the groove 70, the teeth 210a of the clip portion 210 are butted against the movement restricting wall 50, and hence, the movement of the clip portion 210 is blocked. Consequently, it is possible to prevent the clip portion 210 of the booster cable 200 from being disengaged from the relief terminal portion 20, in the same manner as the booster cable holding structure 1 in the exemplary embodiment.

Although the booster cable holding structures 1 and 2 in the exemplary embodiment according to the invention are exemplified in a form to be incorporated in the electric junction box 100, the invention is not limited to the case, but the booster cable holding structures 1 and 2 may be incorporated in other apparatuses than the electric junction box 100.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A booster cable holding structure comprising a clamping connection portion configured to be clamped by a clip portion of a booster cable, the clamping connection portion comprising a relief terminal portion provided to protrude in a tabular manner from a base structure made of insulating resin, and a terminal supporting resin portion made of resin and provided to extend in a tabular manner from the base structure over a surface of the relief terminal portion, wherein the terminal supporting resin portion comprises:
a groove into which at least one tooth of the clip portion enters when the clip portion clamps the clamping connection portion; and
a movement restricting wall configured to block a movement of the clip portion, the movement restricting wall being provided on a side toward which the clip portion having the tooth entered the groove is moved along the groove by an external force that pulls a cable of the booster cable, the movement restricting wall being positioned to allow movement of the tooth within the groove substantially along a height of the relief terminal portion.

2. The booster cable holding structure according to claim 1, wherein the groove is configured to extend linearly, and has, with respect to a direction in which the groove extends, one end closed by the movement restricting wall and another end being opened.

3. The booster cable holding structure according to claim 2, wherein the movement restricting wall has a wall height that is flush with an upper end face of the groove with respect to a direction of a depth of the groove.

\* \* \* \* \*